(12) United States Patent
Schatz et al.

(10) Patent No.: US 10,533,350 B2
(45) Date of Patent: Jan. 14, 2020

(54) TOUCH AND GESTURE PAD FOR SWIPE/TAP ENTRY VERIFICATION SYSTEM

(71) Applicant: Magna Closures Inc., Newmarket (CA)

(72) Inventors: Kurt M. Schatz, Uxbridge (CA); Samuel R. Baruco, Aurora (CA); J. R. Scott Mitchell, Newmarket (CA); Marlon D. R. Hilla, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 146 days.

(21) Appl. No.: 15/597,247

(22) Filed: May 17, 2017

(65) Prior Publication Data

US 2017/0335606 A1   Nov. 23, 2017

Related U.S. Application Data

(60) Provisional application No. 62/340,097, filed on May 23, 2016.

(51) Int. Cl.

| | |
|---|---|
| *G06F 3/02* | (2006.01) |
| *G06F 3/0488* | (2013.01) |
| *E05B 81/04* | (2014.01) |
| *E05B 81/56* | (2014.01) |
| *E05B 85/10* | (2014.01) |

(Continued)

(52) U.S. Cl.
CPC .............. *E05B 81/77* (2013.01); *E05B 81/04* (2013.01); *E05B 81/56* (2013.01); *E05B 85/10* (2013.01); *G06F 3/0202* (2013.01); *G06F 3/03547* (2013.01); *G06F 3/0416* (2013.01); *G06F 3/0421* (2013.01); *G06F 3/04883* (2013.01); *G06F 2203/04808* (2013.01)

(58) Field of Classification Search
CPC .......... E05B 81/04; E05B 81/56; E05B 81/77; E05B 85/10; E05B 17/10; E05B 41/00; E05B 81/78; E05B 85/16; G06F 3/0202; G06F 3/03547; G06F 3/0416; G06F 3/0421; G06F 3/04883; G06F 2203/04808; B60Q 1/2669; Y10T 16/458; Y10T 70/8027

See application file for complete search history.

(56) References Cited

U.S. PATENT DOCUMENTS

| | | | |
|---|---|---|---|
| 8,400,265 B2 * | 3/2013 | Sarioglu ................. | E05B 17/10 313/510 |
| 9,741,184 B2 * | 8/2017 | Iyer ..................... | G07C 9/00007 |

(Continued)

*Primary Examiner* — Nelson M Rosario
(74) *Attorney, Agent, or Firm* — Dickinson Wright PLLC

(57) ABSTRACT

A touch and gesture pad for a swipe/tap entry verification system and a method of operating the touch and gesture pad are disclosed. The touch and gesture pad includes a housing that defines a compartment. The touch and gesture pad includes a wiring connector for attachment to a wiring harness to provide power and communication with a processing unit. A PCB is disposed in the compartment. A plurality of IR TOF sensors are disposed on and electrically connected to the PCB for sensing gestures and touches to the touch and gesture assembly. The plurality of IR TOF sensors each includes a transmitter for transmitting an infrared beam and a receiver for receiving the infrared beam after reflection from an object near one of the plurality of IR TOF sensors and for outputting an IR TOF signal to the processing unit indicating touches or gestures.

15 Claims, 11 Drawing Sheets

(51) Int. Cl.
  *G06F 3/0354* (2013.01)
  *G06F 3/041* (2006.01)
  *G06F 3/042* (2006.01)

(56) References Cited

U.S. PATENT DOCUMENTS

| | | | |
|---|---|---|---|
| 2006/0145825 A1* | 7/2006 | McCall | B60R 25/2045 340/426.35 |
| 2010/0134424 A1* | 6/2010 | Brisebois | G06F 3/03547 345/173 |
| 2014/0278173 A1* | 9/2014 | Elia | G01R 35/007 702/65 |
| 2016/0232341 A1* | 8/2016 | Alameh | G06F 21/35 |
| 2017/0255327 A1* | 9/2017 | Simmons | G06F 1/3262 |

* cited by examiner

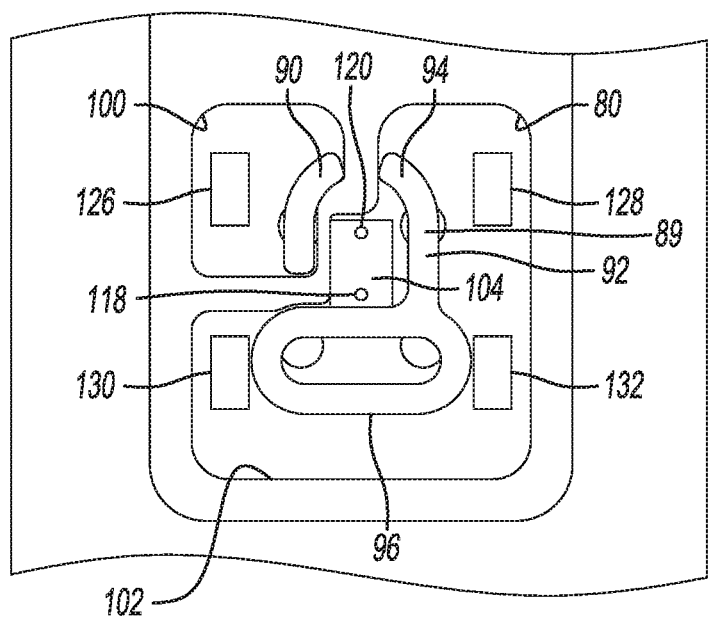
_Fig-7A_
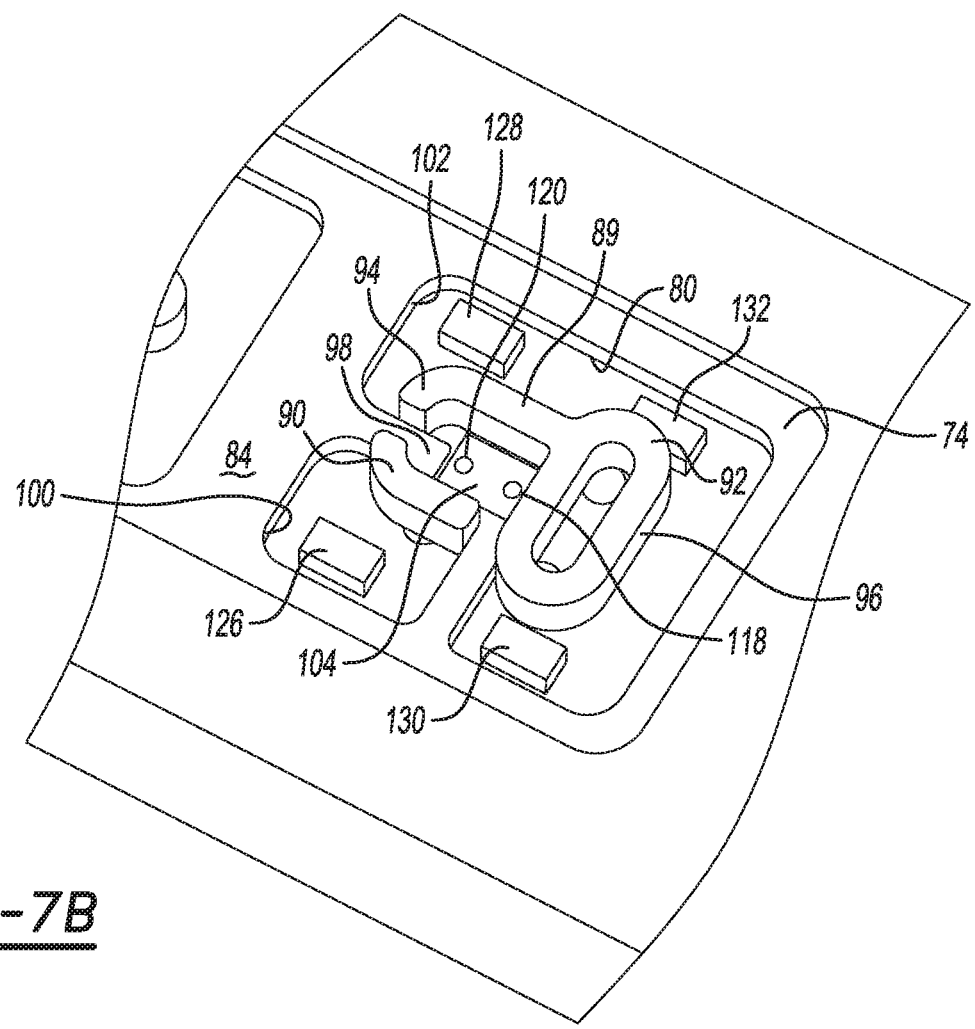
_Fig-7B_

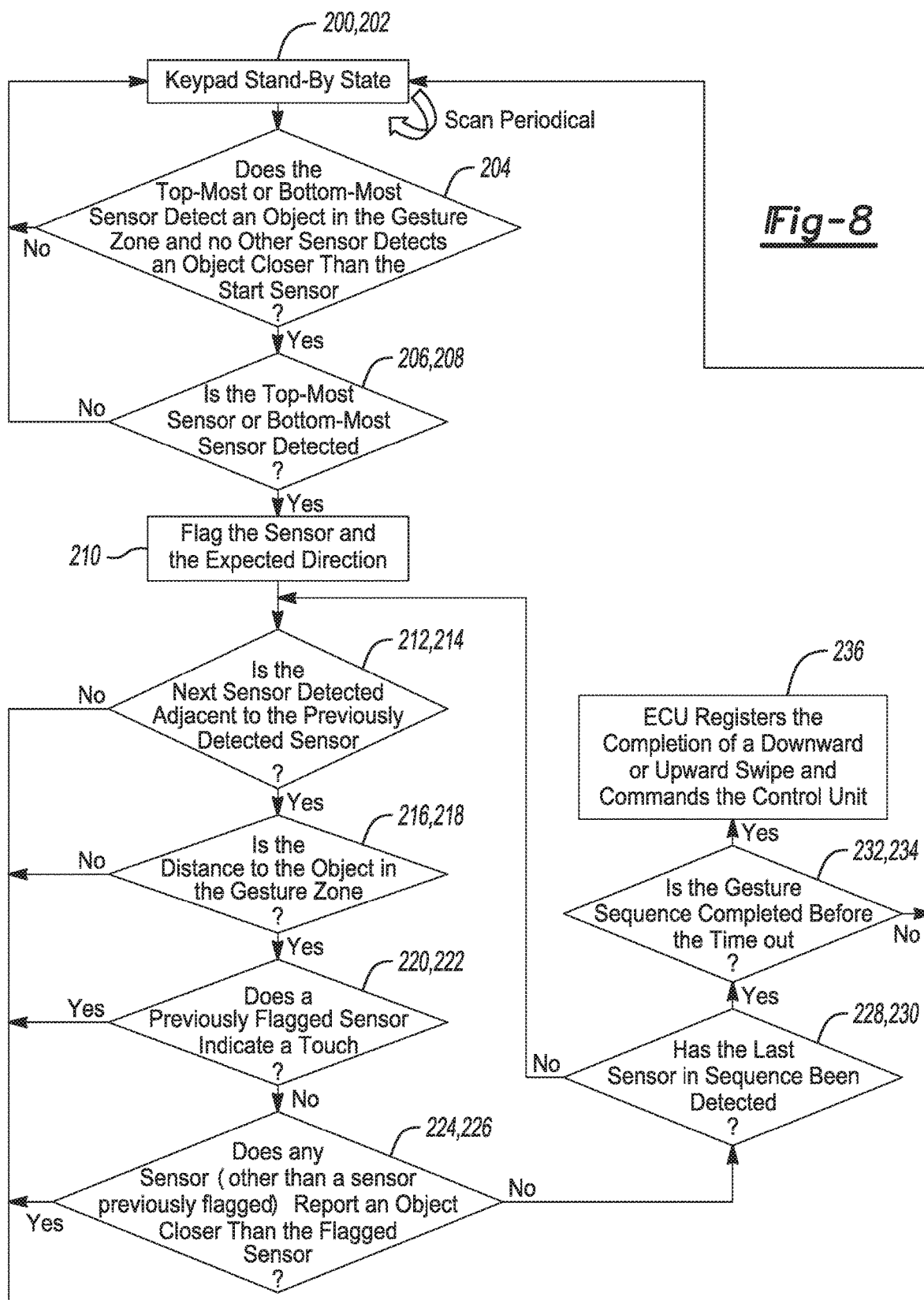

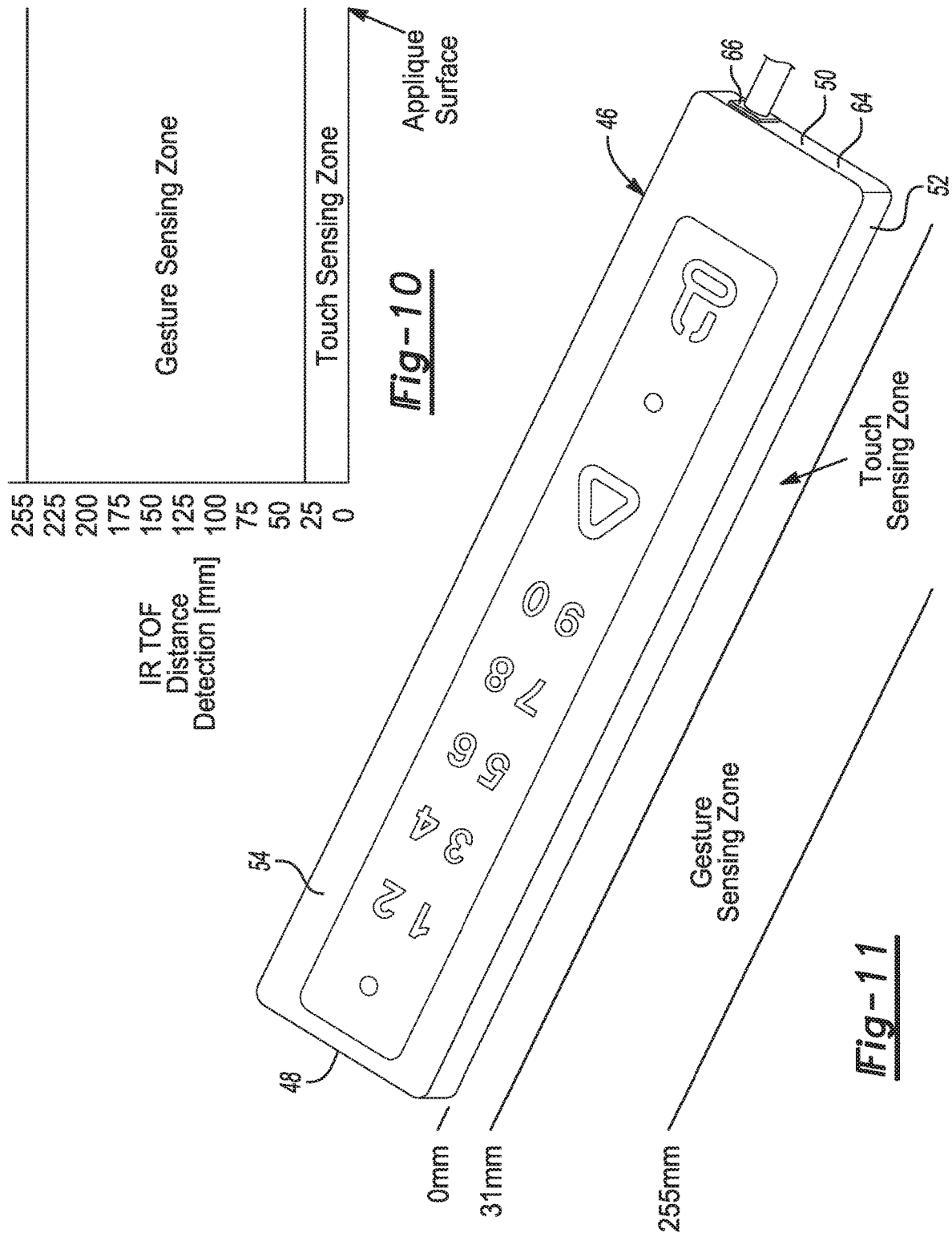

Touch on S3

TOUCH AND GESTURE PAD FOR SWIPE/TAP ENTRY VERIFICATION SYSTEM

CROSS-REFERENCE TO RELATED APPLICATIONS

This utility application claims the benefit of U.S. Provisional Application No. 62/340,097 filed May 23, 2016. The entire disclosure of the above application is incorporated herein by reference.

FIELD

The present disclosure relates generally to an entry system for motor vehicles and, more particularly, to a touch and gesture pad for a swipe/tap entry verification system and a method of operating the touch and gesture pad.

BACKGROUND

This section provides background information related to the present disclosure which is not necessarily prior art.

Many passenger vehicles and trucks are now equipped with keyless entry systems alone or in combination with a traditional mechanical-type (i.e. key) entry system. In many instances, the keyless entry system includes a portable device, such as a key fob, having pushbuttons that can be manipulated to unlock/lock the vehicle doors as well as perform other functions (i.e. selective activation of alarms, headlights and/or the ignition system) through encoded RF signals transmitted to a vehicle-installed receiver. Typically, the signals supplied to the receiver are primarily used to control the selective locking and unlocking of a power-operated door latch mechanism.

Certain vehicles may be equipped with a vehicle-mounted keyless entry system. Typically, a touch device, such as a keypad, is mounted to the vehicle in close proximity to the door handle (i.e. on the door or the B-pillar) which enables an authorized user to enter a passcode consisting of a sequence of alpha or numerical codes. Upon verification of the passcode, an on-board controller unit controls operation of the power-operated door latch mechanism. The keypad may also be used to control other vehicle operational functions such as, for example, power release of the gas tank cover or the tailgate lift system following entry and verification of the correct passcode. Some keypads use pushbuttons and/or switches to enter the authentication code. One example of a touchless keyless entry keypad associated with a vehicle entry system is disclosed in U.S. Pat. No. 8,400,265 (hereinafter the '265 patent") the entire disclosure of which is herein incorporated by reference. As disclosed in the '265 patent, a plurality of proximity sensors, such as capacitive sensors, are used as the code input interfaces associated with the keypad.

Still other vehicles may be equipped with a passive keyless entry (PKE) system which utilizes a transmitter carried by the user to provide a signal to the vehicle-mounted receiver for controlling activation of the power-operated door latch mechanism with some limited tactile input from the user. Typically, close proximity of the transmitter to the vehicle and a single action, such as touching the door handle or waving in proximity to a motion detector, act to control the locking and unlocking function of the vehicle door.

While such keyless entry systems have found widespread applications in vehicle door systems (i.e. passenger doors, tailgates and closure doors), a need exists to continually advance the art and address known deficiencies associated with conventional keyless entry systems. For example, a need exists to provide additional authentication protocol to improve security and limit unintended access to the vehicle's passenger and/or storage compartments. Another need to be addressed includes limiting electrical power usage associated with "false activation" of the keypad caused by inadvertent inputs to the keypad. Such inadvertent inputs can, for example, be caused by rain, flying debris or carwash spray jets contacting the capacitive sensors associated with the keypad. As a byproduct of solving such deficiencies, inadvertent operation of the door latch mechanism will be prevented to maintain the door in its proper locked or unlocked state.

A need therefore exists for an improved method and system of keyless entry of passenger entry doors and closure members in motor vehicles and other devices. Accordingly, a solution that addresses, at least in part, the above-noted shortcomings and advances the art is desired.

SUMMARY

This section provides a general summary of the present disclosure and is not intended to be interpreted as a comprehensive disclosure of its full scope or all of its features, aspects and objectives.

According to an aspect of the disclosure, a touch and gesture assembly for a swipe/tap entry verification system including a touch and gesture pad is provided. The touch and gesture pad defines a plurality of selectable regions and is in communication with a processing unit. The touch and gesture pad includes a plurality of IR TOF sensors in a spaced relationship with one another for sensing at least one of a touch to the touch and gesture assembly in the selectable regions and a gesture adjacent to the touch and gesture assembly. The plurality of IR TOF sensors each includes a transmitter for transmitting an infrared beam and a receiver for receiving the infrared beam after reflection from an object near one of the plurality of IR TOF sensors and for outputting an IR TOF signal to the processing unit indicating one of the touch and the gesture.

According to another aspect of the disclosure, a method of operating a touch and gesture pad to sense a gesture is also provided. The method includes the step of maintaining a processing unit in a stand-by state. Next, periodically scanning for an IR TOF signal from one of a plurality of IR TOF sensors using the processing unit in the stand-by state. The method proceeds by determining whether one of a top-most-sensor and a bottom-most sensor detects an object in a gesture sensing zone. The method then includes the step of returning to the stand-by state in response to not detecting that the object is in the gesture sensing zone with one of the bottom-most sensor and the top-most sensor. Then, flagging one of the top-most sensor and the bottom-most sensor as a previously detected sensor and an expected direction in response to detecting that the object is in the gesture sensing zone. The method continues with the step of determining whether a next sensor detects the object and whether the next sensor detecting the object is adjacent to the previously detected sensor. The next step of the method is returning to the stand-by state in response to the next sensor detecting the object not being adjacent to the previously detected sensor. Then, determining whether the gesture sequence is completed before a predetermined time elapses. The method also includes the step of returning to the stand-by state in response to the gesture sequence not being completed before the predetermined time elapses. The method concludes with the step of registering the completion of one of a downward swipe and an upward swipe in response to the gesture sequence being completed before the predetermined time elapses.

According to yet another aspect of the disclosure, a method of operating a touch and gesture pad to detect a touch is additionally provided. The method begins by maintaining a processing unit in the stand-by state. The method continues with the step of periodically scanning for a first IR TOF signal from one of the plurality of IR TOF sensors using the processing unit in the stand-by state. Next, determining whether the first IR TOF signal from one of the plurality of IR TOF sensors is a first value indicating that an object is in a touch sensing zone to define a touch condition. The method also includes the step of returning to the stand-by state in response to the first IR TOF signal not being the first value. The method can proceed by determining whether the touch condition is maintained for greater than a first preset time period and returning to the stand-by state in response to the touch condition not being maintained for greater than the first preset time period. The method then includes the step of storing at least one of a sensor number of a stored sensor sequence associated with the IR TOF sensor that has detected the touch condition. The method continues by determining whether the stored sensor sequence matches a security code in response to a determination that the required number of touches has been reached. The next steps of the method are registering the completion of coded sequence in response to stored sensor sequence matching the security code and returning to the stand-by state in response to the stored sensor sequence not matching the security code.

According to another aspect, a method of operating a touch and gesture pad to sense at least one of a gesture and a touch is also provided. The method starts with the step of defining a plurality of selectable regions on the touch and gesture pad, the touch and gesture pad being in communication with a processing unit. Next, spacing a plurality of IR TOF sensors in a spaced relationship with one another for sensing at least one of a touch to the touch and gesture pad in the plurality of selectable regions and a gesture adjacent to the touch and gesture pad. The method continues by periodically scanning for an IR TOF signal from one of the plurality of IR TOF sensors using the processing unit. The method concludes with the step of determining by the processing unit whether the IR TOF signal from one of the plurality of IR TOF sensors is one of a value indicating that an object is in a gesture sensing zone to define the gesture and a value indicating that the object is in a touch sensing zone to define the touch.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which:

FIGS. 7A and 7B are enlarged perspective views of a lock indicator of the touch and gesture pad according to aspects of the disclosure;

FIG. 8 is a flowchart illustrating steps of a method of operating a touch and gesture pad to sense a gesture according to aspects of the disclosure;

FIGS. 10 and 11 illustrate a touch sensing zone and a gesture sensing zone of the touch and gesture pad according to aspects of the disclosure;

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to a touch and gesture assembly of the type well-suited for use in many applications. More specifically, a touch and gesture pad for a swipe/tap entry verification system and a method of operating the touch and gesture pad are disclosed herein. The touch and gesture pad for the swipe/tap entry verification system of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure.

Figure 1:
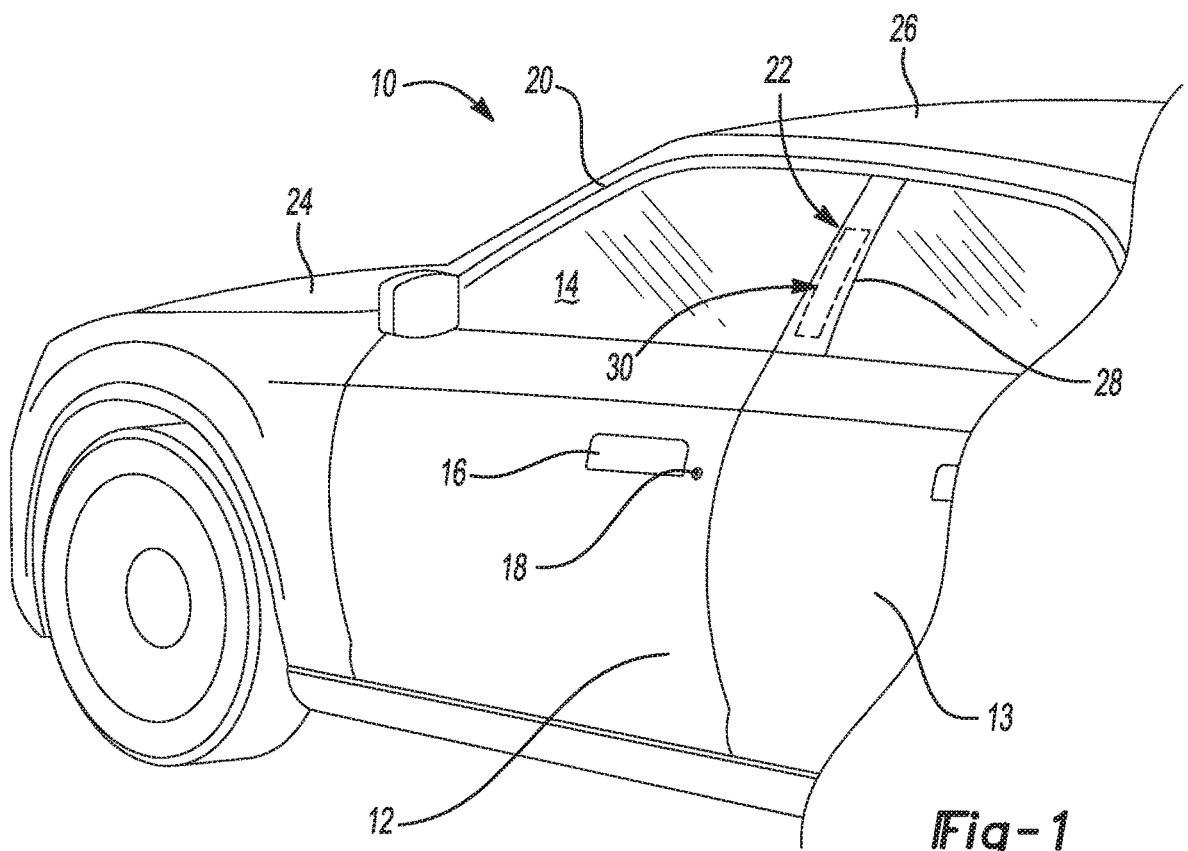
FIG. 1 is a partial perspective side view of a motor vehicle equipped with a keyless entry system according to aspects of the disclosure.

Referring to the Figures, wherein like numerals indicate corresponding parts throughout the several views, a side view of a motor vehicle 10 is shown partially cut away in FIG. 1 to include a driver-side front door 12 and a driver-side rear door 13 which both provide access to a passenger compartment 14. Front door 12 is shown to include a door handle 16 and a key hole 18 is provided for otherwise conventional locking and unlocking of a mechanically-activated latch mechanism (not shown) mounted within front door 12. Movement of the door handle 16 functions to release front door 12 for movement relative to body portion 24 when the latch mechanism is unlocked. A similar door handle (not shown) could be provided on rear door 13 and interconnected to another latch mechanism (not shown) provided for locking and unlocking rear door 13. As will be detailed, each of the latch mechanisms may also include a power-operated actuator for controlling the locking and unlocking functions in association with a keyless or swipe/tap entry verification entry system. Motor vehicle 10 is shown to also include an A-pillar 20, a B-pillar 22, and a roof portion 26.

Figure 2A:
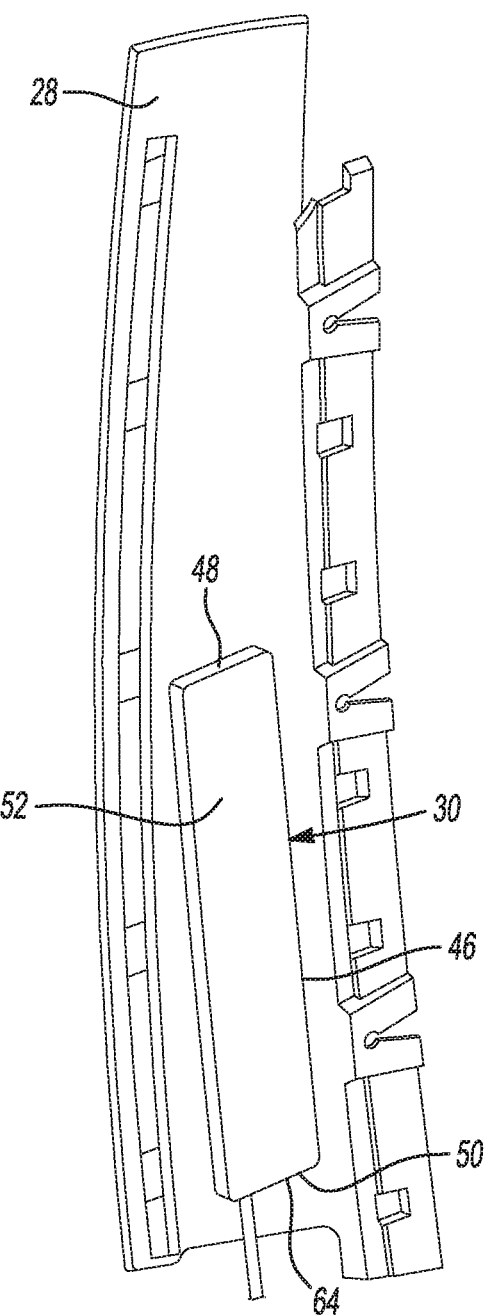
FIGS. 2A and 2B illustrate an applique with an attached touch and gesture assembly for a keyless entry system according to aspects of the disclosure.
Figure 2B:
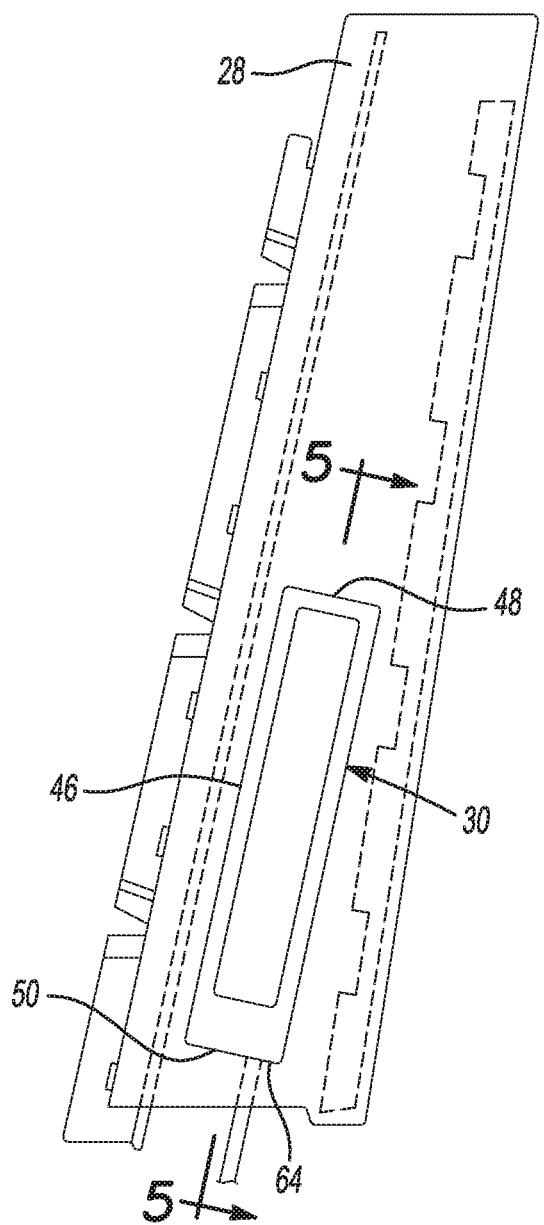

In the example shown in FIG. 1, B-pillar 22 is covered by a cover plate assembly or applique 28. The touch and gesture assembly 30 associated with the keyless entry system of the present disclosure is mounted to B-pillar 22 within applique 28 (e.g., on a "dry side", or interior side, of the applique 28) at the location identified by the dashed lines. FIGS. 2A and 2B illustrate a more detailed view of the mounting of the touch and gesture assembly 30 within the applique 28. Touch and gesture assembly 30 is mounted between a structural portion of B-pillar 22 and applique 28. Specifically, the touch and gesture assembly 30 may be attached to the applique 28 using adhesive, tape, or screws, for example. As an alternative, the touch and gesture assembly 30 could be mounted to front door 12 in proximity to door handle 16 (not shown).

Figure 3:
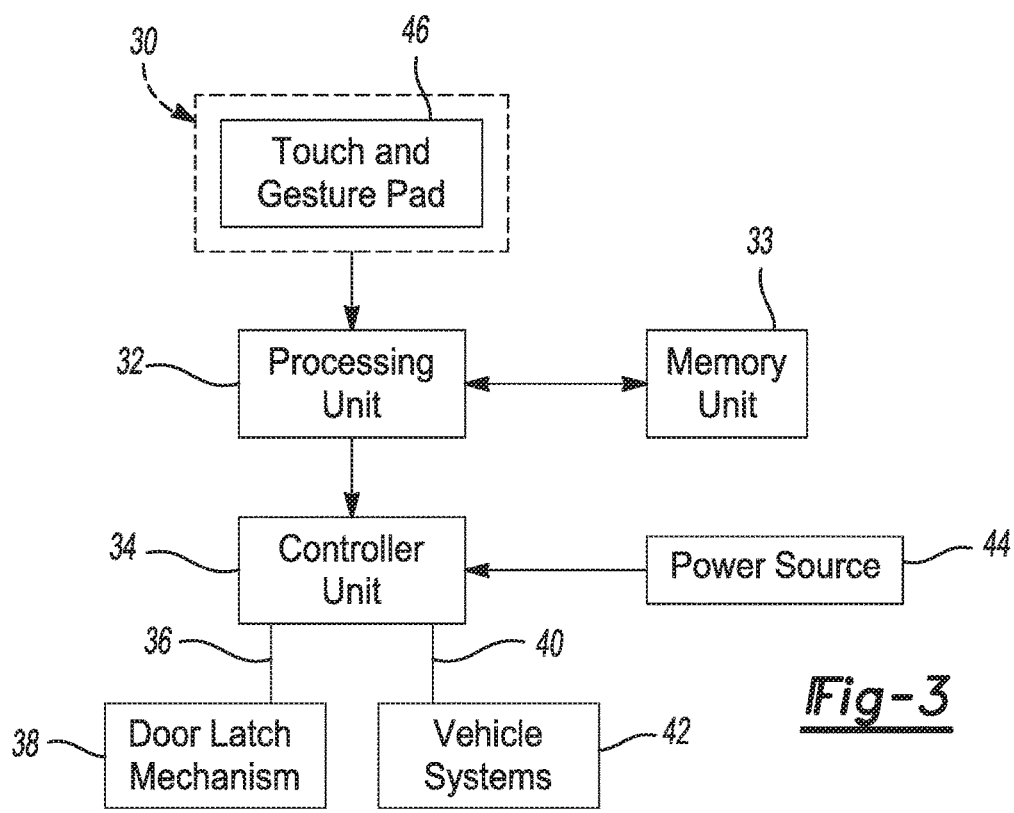
FIG. 3 is a block diagram generally depicting the various components of the keyless entry system according to aspects of the disclosure.

Referring now to FIG. 3, a block diagram of various components of the keyless entry system is provided. As seen, touch and gesture assembly 30 includes or is connected to a processing unit 32 which, in turn, communicates with a controller unit 34. Controller unit 34 is configured to execute software code and/or instructions stored on a memory unit 33, such as an EEPROM or other type or memory device such as a solid state disk, RAM, hard disk or the like, and provides an electrical output along first line 36 to a power-operated actuator of a door latch mechanism 38. As is known, controller unit 34 may also provide electrical outputs along second lines 40 for controlling other vehicle systems 42 (i.e. power release of a trunk or liftgate, actuation of the lights and/or security functions, and activation of the ignition system and/or the vehicle's heating system, etc.). A power source 44, such as a battery, may provide power to controller unit 34. As will be detailed, touch and gesture assembly 30 includes a touch and gesture pad 46.

The operation of the keyless entry system of FIG. 3 is configured to permit selective access to passenger compartment 14 via front door 12 or, in the alternative, both doors 12, 13 when the operator (hereinafter, the "user") enters an authorization code via touch and gesture pad 46. The authentication code entered is transmitted to processing unit 32 where it is compared to a correct or verification code stored in a memory. If the entered passcode matches the verification code stored in the memory unit 33, a signal is sent to controller unit 34 which, in turn, will unlock latch mechanism 38 and permit operation of door handle 16 to release front door 12 (or both doors 12, 13) and allow access to passenger compartment 14. Those skilled in the art will recognize that this rudimentary control diagram shown in FIG. 3 is merely an example of only one suitable arrangement for the keyless entry system.

Figure 4:
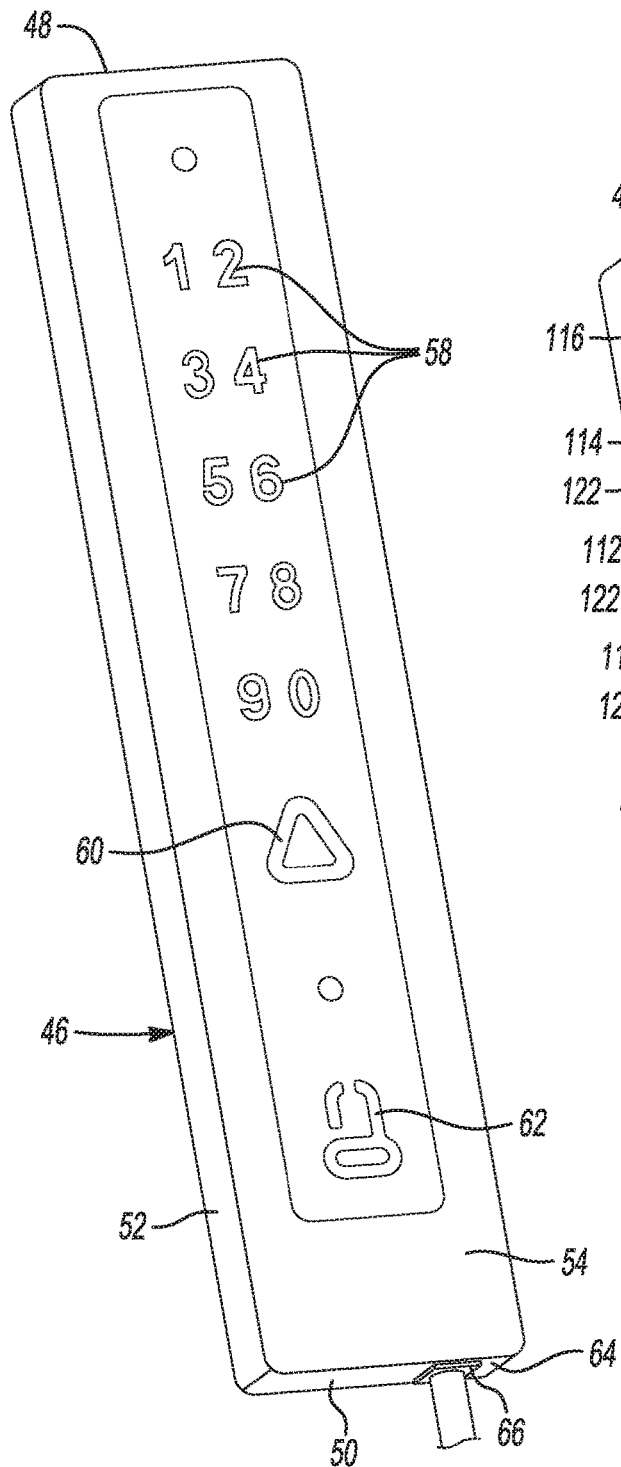
FIG. 4 is a perspective view of a touch and gesture pad of the touch and gesture assembly according to aspects of the disclosure.

Referring now to FIG. 4, touch and gesture assembly 30 is shown with touch and gesture pad 46 configured to define a user-input touch interface adapted to sense user inputs, such as a touch (i.e., tap) or a gesture. The touch and gesture pad 46 extends from a first end 48 to a second end 50 and includes a housing 52 made of plastic (e.g., polypropylene) and a cover 54 of clear acrylic attached to the housing 52 to define a compartment 56. The cover 54 has a top side and a bottom side and includes a black infrared transmissive ink printed on the bottom side for defining a plurality of selectable or numeral regions 58 and a diagnostic indicator region 60 and a lock indicator region 62. More specifically, the ink may only be transmissive to wavelengths above 750 nanometers and so visible light cannot pass. The numeral regions 58 are not printed with the black infrared transmissive ink and may be left clear, or printed in another color, such as red or white. The touch and gesture pad 46 also includes a wiring connector 64 for attachment to a wiring harness to provide electrical power and communication with the processing unit 32. The wiring connector 64 includes a wire harness seal 66 for preventing intrusion of dirt and liquids into the compartment 56. It should be appreciated that other materials and/or configurations may be utilized for the touch and gesture pad 46.

Figure 5:
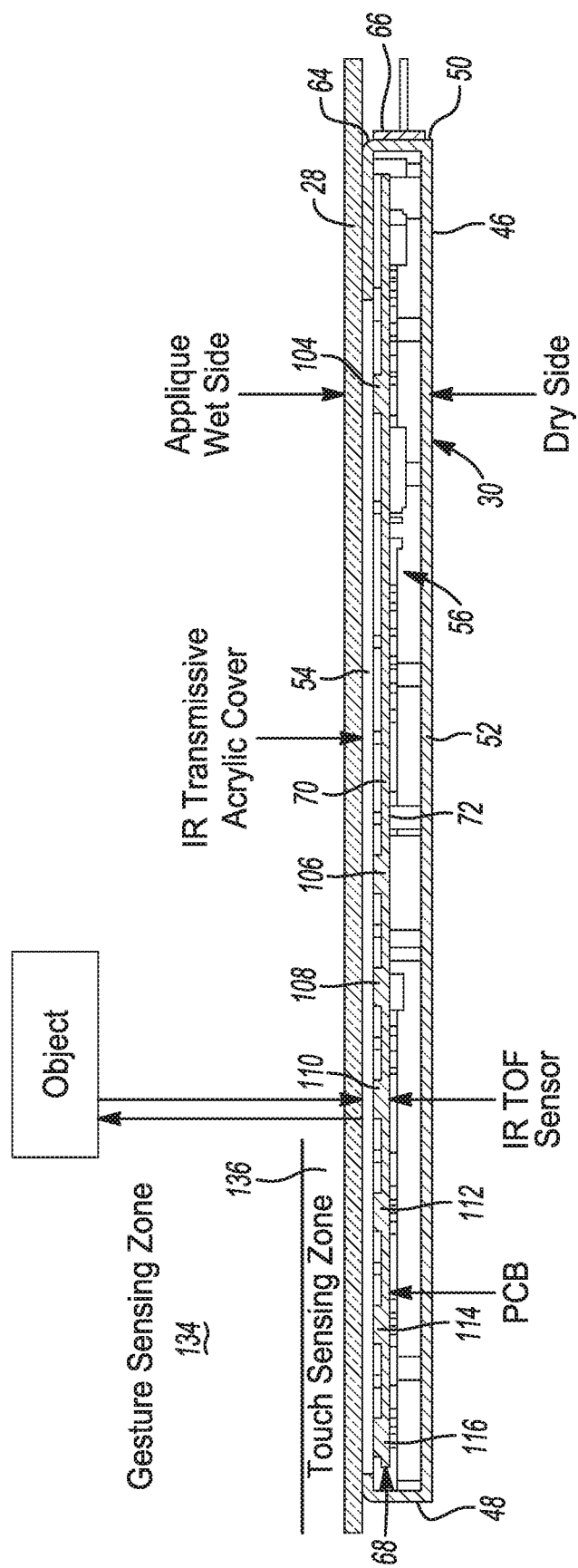
FIG. 5 is a cross-sectional view of the touch and gesture assembly taken along line 5-5 according to aspects of the disclosure.

As best shown in FIG. 5, the touch and gesture pad 46 includes a PCB 68 (printed circuit board) that has a first side 70 facing the cover 54 and a second side 72. The PCB 68 is attached to the wiring connector 64 and is disposed in the compartment 56. The second side 72 of the PCB 68 can contain electronic components associated with the processing unit 32, for example.

Figure 6:
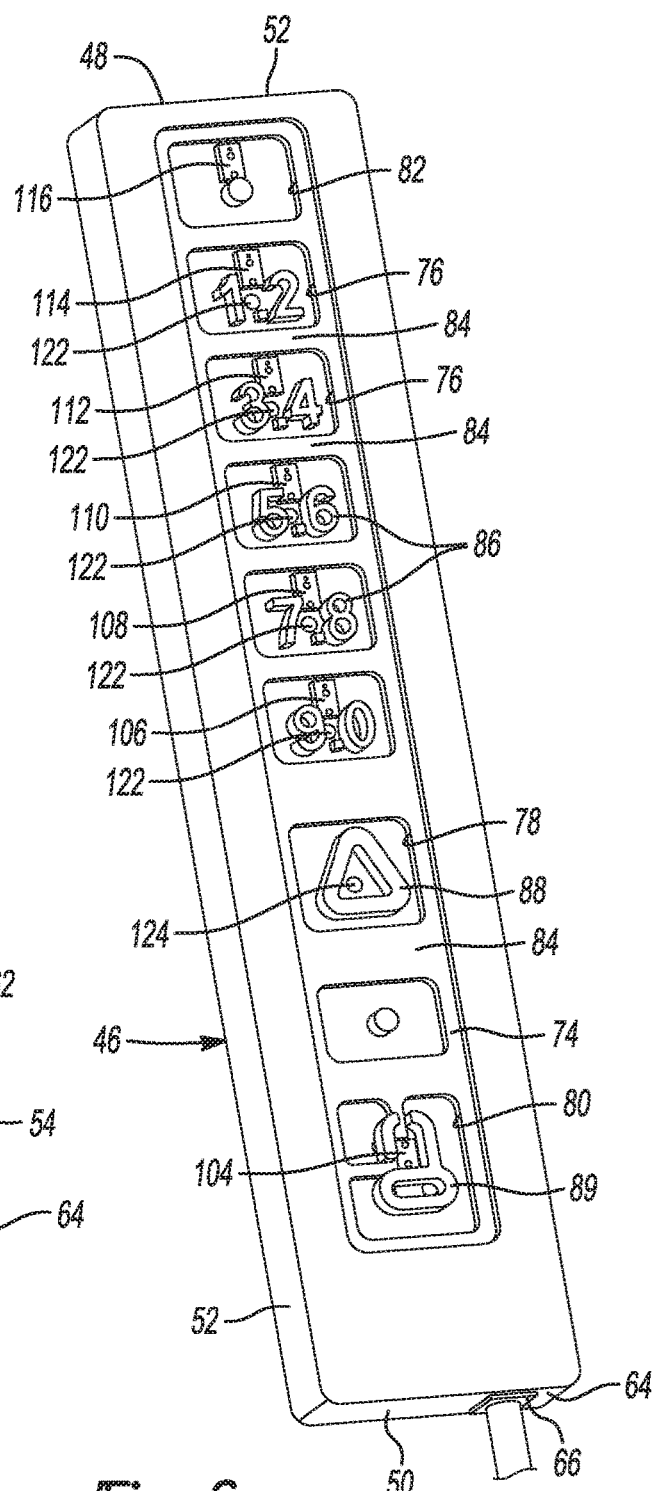
FIG. 6 is a perspective view of a touch and gesture pad of the touch and gesture assembly with a cover removed according to aspects of the disclosure.

Referring now to FIG. 6, in which the cover 54 is removed from the touch and gesture pad 46, an intermediate layer 74 is illustrated. The intermediate layer 74 is disposed between the PCB 68 and the cover 54 and defines a plurality of numeral recesses 76 and a diagnostic indicator recess 78 and a lock indicator recess 80 and a sensor recess 82. The intermediate layer 74 also includes a plurality of divider ribs 84 disposed between the recesses 76, 78, 80, 82 for isolating light within the recesses 76, 78, 80, 82. A plurality of raised numerals 86 of light transmissive material are disposed in each of the plurality of numeral recesses 76. Similarly, a raised diagnostic indicator 88 of light transmissive material is disposed in the diagnostic indicator recess 78. A raised lock indicator 89 of light transmissive material is disposed in the lock indicator recess 80.

As best shown in FIGS. 7A and 7B, the raised lock indicator 89 includes a first raised lock indicator section 90 and a second raised lock indicator section 92 that has an upper portion 94 and a lower oblong portion 96. The first raised lock indicator section 90 and the second raised lock indicator section 92 are disposed in the lock indicator recess 80. A lock indicator rib 98 extends between the first raised lock indicator section 90 and the second raised lock indicator section 92 in the lock indicator recess 80 for separating the lock indicator recess 80 into a first lock light chamber 100 and a second lock light chamber 102.

Referring back to FIGS. 5 and 6, a plurality of IR TOF sensors 104, 106, 108, 110, 112, 114, 116 are disposed on and electrically connected to the first side 70 of the PCB 68 in a spaced relationship with one another for sensing one of a gesture and a touch to the touch and gesture assembly 30. The plurality of IR TOF sensors 104, 106, 108, 110, 112, 114, 116 each include a transmitter 118 for transmitting an infrared beam and a receiver 120 for receiving the infrared beam after reflection from an object near one of the plurality of IR TOF sensors 104, 106, 108, 110, 112, 114, 116 and for outputting an IR TOF signal to the processing unit 32 indicating one of the touch and the gesture. Time of flight (TOF) sensing allows an absolute distance to be measured independently of a target's reflectance. Sensors utilizing this technology measure the amount of time it takes light to travel from an emitter to the target and back (i.e., time of flight). As described herein, the IR TOF sensors 104, 106, 108, 110, 112, 114, 116 preferably utilize infrared (IR) light emission with an 850 nanometer wavelength. It should be understood that other wavelengths may be used in the alternative.

The plurality of IR TOF sensors 104, 106, 108, 110, 112, 114, 116 include a first IR TOF sensor 104 (i.e., S1) disposed adjacent the second end 50 of the touch and gesture pad 46 in the lock indicator recess 80 in between the first raised lock indicator section 90 and the second raised lock indicator section 92. A second IR TOF sensor 106 is disposed in one of the plurality of numeral recesses 76. Likewise, a third IR TOF sensor 108 is disposed in one of the plurality of numeral recesses 76. A fourth IR TOF sensor 110 is similarly disposed in one of the plurality of numeral recesses 76. The plurality of IR TOF sensors 104, 106, 108, 110, 112, 114, 116 also includes a fifth IR TOF sensor 112 disposed in one of the plurality of numeral recesses 76 and a sixth IR TOF sensor 114 disposed in one of the plurality of numeral recesses 76. Finally, a seventh IR TOF sensor 116 (i.e., S7) is disposed in the sensor recess 82. The plurality of IR TOF sensors 104, 106, 108, 110, 112, 114, 116 can communicate with the processing unit 32 via an I2C bus, for example, which may be illustratively defined by traces etched on the PCB 68.

As best shown in FIG. 6, a plurality of numeral LEDs 122 (light emitting diodes) are disposed on and electrically connected to the first side 70 of the PCB 68 in a spaced relationship with one another and each extends into one of the plurality of numeral recesses 76. Each of the plurality of numeral LEDs 122 is adjacent to one of the second IR TOF sensor 106 and the third IR TOF sensor 108 and the fourth IR TOF sensor 110 and the fifth IR TOF sensor 112 and the sixth IR TOF sensor 114 for illuminating the plurality of numeral regions 58. A diagnostic LED 124 is disposed on and is electrically connected to the first side 70 of the PCB 68. The diagnostic LED 124 extends into the diagnostic indicator recess 78 for illuminating the diagnostic indicator region 60. A plurality of lock indicator LEDs 126, 128, 130, 132 (FIGS. 7A and 7B) are disposed on and electrically connected to the first side 70 of the PCB 68 for illuminating the lock indicator region 62.

As can be seen in FIGS. 7A and 7B, the plurality of lock indicator LEDs 126, 128, 130, 132 include a first lock indicator LED 126 disposed adjacent the first raised lock indicator section 90 and extending into the first lock light chamber 100 of the lock indicator recess 80 for illuminating the first raised lock indicator section 90. A second lock indicator LED 128 extends into the second lock light chamber 102 of the lock indicator recess 80 for illuminating the upper portion 94 of the second raised lock indicator section 92. A third lock indicator LED 130 and a fourth lock indicator LED 132 each extend into the second lock light chamber 102 of the lock indicator recess 80 for illuminating the lower oblong portion 96 of the second raised lock indicator section 92. So, the plurality of lock indicator LEDs 126, 128, 130, 132 can provide illumination from the side and the first raised lock indicator section 90 and the second raised lock indicator section 92 may be separately illuminated.

A method of operating a touch and gesture pad 46 to sense a gesture is disclosed. For example, this gesture sensing could be used to unlock the door 12, 13 if the user has a keyfob nearby the motor vehicle 10 (e.g., in his or her pocket) and the user does not want to reach into their pocket and press the unlock button on the keyfob. Generally, the start of a gesture movement or sequence is flagged when either the top-most sensor (e.g., the seventh IR TOF sensor 116) or bottom-most sensor (e.g., the first IR TOF sensor 104) detects an object in the gesture sensing zone 134 (see FIG. 5) and none of the other IR TOF sensors 104, 106, 108, 110, 112, 114, 116 detects an object closer than the start sensor (e.g., either the top-most or bottom-most sensor). If the top-most sensor detects the object first, then the start of a downward swipe is flagged. If the bottom-most sensor detects the object first, then motion is flagged as an upward swipe. The system anticipates that the next sensor in the direction that was flagged will be active. More specifically, one of the plurality of IR TOF sensors 104, 106, 108, 110, 112, 114, 116 is considered to be active, or it is considered to be an active sensor, if the object is in the gesture sensing zone 134 and no other IR TOF sensors 104, 106, 108, 110, 112, 114, 116, other than those previously flagged, reports an object closer than this sensor. If this condition is not met, the gesture sequence is reset. Additionally, to be an active sensor, no previously flagged sensor indicates a touch (as described in more detail below). If this condition is not met, the gesture sequence is reset. Also, activity for an active sensor must be detected before timing out (e.g., before a predetermined time elapses). Determination of an active sensor is repeated until the final sensor is processed successfully. At this point, a successful upward or downward gesture is reported.

Figure 9A:
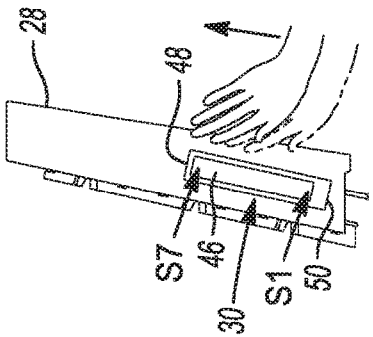
FIGS. 9A and 9B illustrate a gesture and corresponding graph of IR TOF (infrared time of flight) signals over time from a plurality of IR TOF sensors of the touch and gesture pad during the gesture according to aspects of the disclosure.
Figure 9B:
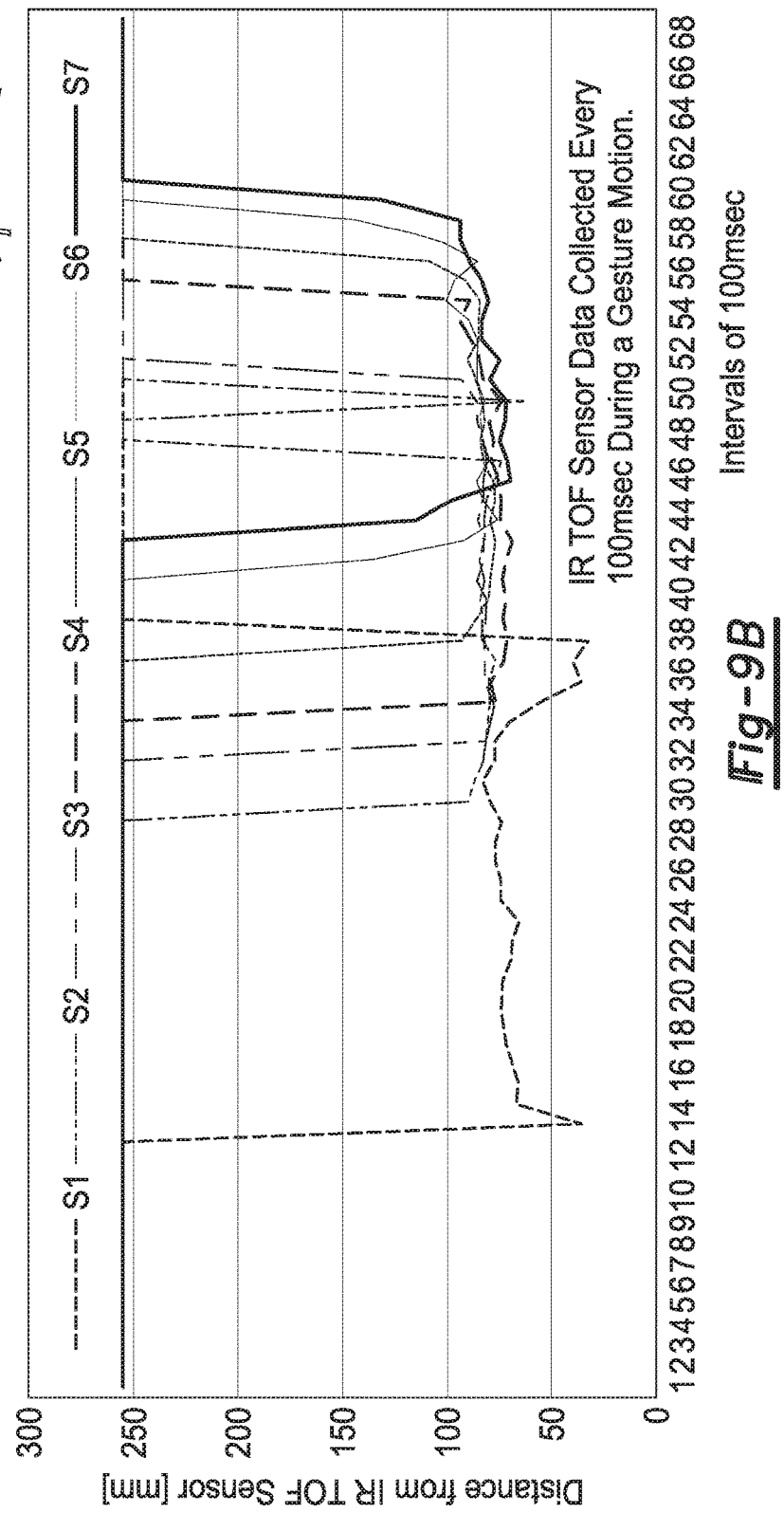

As illustrated more specifically in FIG. 8, the method of operating a touch and gesture pad 46 to sense a gesture begins with the step of 200 maintaining a processing unit 32 in a stand-by state. Next, 202 periodically scanning for an IR TOF signal from one of a plurality of IR TOF sensors 104, 106, 108, 110, 112, 114, 116 (e.g., the first IR TOF sensor 104 and the second IR TOF sensor 106 and the third IR TOF sensor 108 and the fourth IR TOF sensor 110 and the fifth IR TOF sensor 112 and the sixth IR TOF sensor 114 and the seventh IR TOF sensor 116) using the processing unit 32 in the stand-by state. In more detail, the IR TOF sensors 104, 106, 108, 110, 112, 114, 116 can be polled via the I2C bus by the processing unit 32 every 1 millisecond, for example. However, other polling rates may also be implemented. An example graph of IR TOF signals from each of the IR TOF sensors 104, 106, 108, 110, 112, 114, 116 during a swipe gesture (FIG. 9A) is shown in FIG. 9B. The method proceeds by 204 determining whether one of a top-most-sensor and a bottom-most sensor (i.e., a "start sensor" or the initial sensor that detects an object) detects an object and none of the other plurality of IR TOF sensors 104, 106, 108, 110, 112, 114, 116 (besides the start sensor) detects the object closer than one of the top-most sensor and the bottom-most sensor. Specifically step 204 can include confirming that one of the second IR TOF sensor 106 and the third IR TOF sensor 108 and the fourth IR TOF sensor 110 and the fifth IR TOF sensor 112 and the sixth IR TOF sensor 114 do not detect an object closer than one of the first IR TOF sensor 104 and the seventh IR TOF sensor 116. Then, 206 determining whether one of the bottom-most sensor (e.g., the first IR TOF sensor 104) and the top-most sensor (e.g., the seventh IR TOF sensor 116) detects the object in a gesture sensing zone 134 in response to one of the bottom-most and the top-most sensor detecting the object and not detecting an object with the other plurality of IR TOF sensors 104, 106, 108, 110, 112, 114, 116 closer than one of the bottom-most sensor and the top-most sensor. In more detail, and shown in FIGS. 10 and 11 the gesture sensing zone 134 is preferably a distance to the object between approximately 31 mm and 255 mm from the applique 28. A touch sensing zone 136 is then preferably a distance to the object between 0 mm to 30 mm from the applique 28. In other words, an IR TOF signal indicating a measured distance between 0-30 mm would be considered a touch, and an IR TOF signal indicating a measured distance between 31-255 mm would be considered a gesture. It should be understood that other distance values could be used instead. The method continues with the step of 208 returning to the stand-by state in response to not detecting that an object is in the gesture sensing zone 134 with one of the bottom-most sensor and the top-most sensor. The method also includes the step of 210 flagging one of the top-most sensor and the bottom-most sensor as a previously detected sensor and an expected direction in response to detecting that the object is in the gesture sensing zone 134.

The method of operating the touch and gesture pad 46 to sense the gesture includes the step of 212 determining whether the next sensor (i.e., another of the plurality of IR TOF sensors 104, 106, 108, 110, 112, 114, 116 besides either the top-most sensor or the bottom-most sensor) detects the object and determining whether the next sensor detecting the object is adjacent to the previously detected sensor. The next step of the method is 214 returning to the stand-by state in response to the next sensor detecting the object not being adjacent to the previously detected sensor. Then, 216 determining whether a distance to the object is in the gesture sensing zone 134 (e.g., 31 mm to 255 mm from applique 28) in response to the next sensor detecting the object being adjacent to the previously detected sensor. The method continues by 218 returning to the stand-by state in response to the distance to the object not being in the gesture sensing zone 134. Next, 220 determining whether the previously detected sensor indicates a touch in response to the distance to the object being in the touch sensing zone 136. The next step of the method is 222 returning to the stand-by state in response to the previously detected sensor indicating a touch. The method then continues by 224 determining whether another of the plurality of IR TOF sensors 104, 106, 108, 110, 112, 114, 116 report an object closer than the previously detected sensor using the processing unit 32 in response to a previously detected sensor not indicating a touch. The next step is, 226 returning to the stand-by state in response to another of the plurality of IR TOF sensors 104, 106, 108, 110, 112, 114, 116 reporting an object closer than the previously detected sensor.

The method of operating the touch and gesture pad 46 to sense the gesture continues with the step of 228 determining whether a last sensor of a gesture sequence been detected in response to another of the plurality of IR TOF sensors 104, 106, 108, 110, 112, 114, 116 not reporting an object closer than the previously detected sensor. Next, 230 returning to the step of determining whether the next sensor detecting the object is adjacent to the previously detected sensor in response to the last sensor of the gesture sequence not being detected. The method continues by 232 determining whether the gesture sequence is completed before a predetermined time elapses in response to the last sensor of the gesture sequence not being detected. Then, 234 returning to the stand-by state in response to the gesture sequence not being completed before the predetermined time elapses. The method concludes with the step of 236 registering the completion of one of a downward swipe and an upward swipe in response to the gesture sequence being completed before the predetermined time elapses. For example, an upward swipe could be detected using the first IR TOF sensor 104 being the bottom-most sensor, the next sensor being the second IR TOF sensor 106, and the last sensor being the seventh IR TOF sensor 116, since the touch and gesture pad 46 is oriented in the motor vehicle 10 as shown in FIGS. 2A and 2B.

Figure 13A:
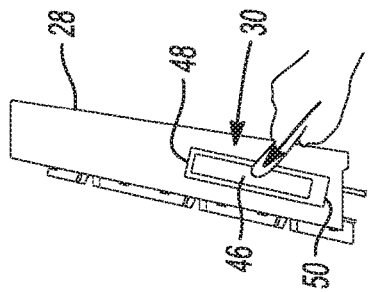
FIGS. 13A and 13B illustrate a touch and a corresponding graph of IR TOF signals over time from the plurality of IR TOF sensors of the touch and gesture pad during the touch according to aspects of the disclosure.

A method of operating the touch and gesture pad 46 to sense a touch is also disclosed. For example, this touch sensing would be for detecting a button press (e.g., press in one of the numeral regions 58), as in entering a passcode to unlock the motor vehicle 10 if the user does not have the keyfob available. The processing unit 32 preferably carries out the steps of the method of operating the touch and gesture pad 46 to sense the gesture, shown in FIG. 9A in parallel (i.e., simultaneously) with the method of operating the touch and gesture pad 46 to sense a touch (FIG. 13A). In general, the method of operating the touch and gesture pad 46 to sense a touch operates with the start of a touch being flagged when any one of the plurality of IR TOF sensors 104, 106, 108, 110, 112, 114, 116 reports a value in the touch sensing zone 136 and no other sensor reports a lower value and this condition is maintained for a first preset time period (e.g., >300 milliseconds). The term "lower value" is illustratively used herein to refer to a distance measurement. For example, to register a touch, one of the plurality of IR TOF sensors 104, 106, 108, 110, 112, 114, 116 reports a value in the 0-25 mm detection zone about one of the numeral regions 58. If no other one of the plurality of IR TOF sensors 104, 106, 108, 110, 112, 114, 116 reports a lower value (a distance of for example between 0-15 mm) then the touch condition is maintained. If one of the plurality of IR TOF sensors 104, 106, 108, 110, 112, 114, 116 reports a lower value, it could indicate that the finger/object has crossed into the detection zones of two adjacent IR TOF sensors 104, 106, 108, 110, 112, 114, 116 and no determination can be made about the numeral region 58 the user desired to press.

The end of a touch is flagged when none of the plurality of IR TOF sensors 104, 106, 108, 110, 112, 114, 116 reports a touch for a second preset time period (e.g., >300 milliseconds). Once the end of a touch is flagged, the index (e.g., a number associated with a region of the touch and gesture pad 46 corresponding with one of the plurality of IR TOF sensors 104, 106, 108, 110, 112, 114, 116) of the touched sensor is stored. The above touch sequence is repeated until the required number of touches is reached. Activity is monitored for timeout (preferably a period of milliseconds). If the timeout is reached, the touch sequence of the touch and gesture pad 46 is reset and the user can restart the touch sequence of the touch and gesture pad 46 over again. The stored indexes are compared to the stored password and a pass/fail evaluation is made and reported. It should be understood that while the methods of operating the touch and gesture pad 46 to sense a touch and a gesture are implemented as disclosed herein, it should be noted that with IR TOF distance data that can be determined from the IR TOF signal it might be possible to implement additional algorithms to further enhance performance. One example of this could be a calculation of an object's speed from the IR TOF distance data to perhaps improve on gesture recognition capabilities and signatures.

Figure 12:
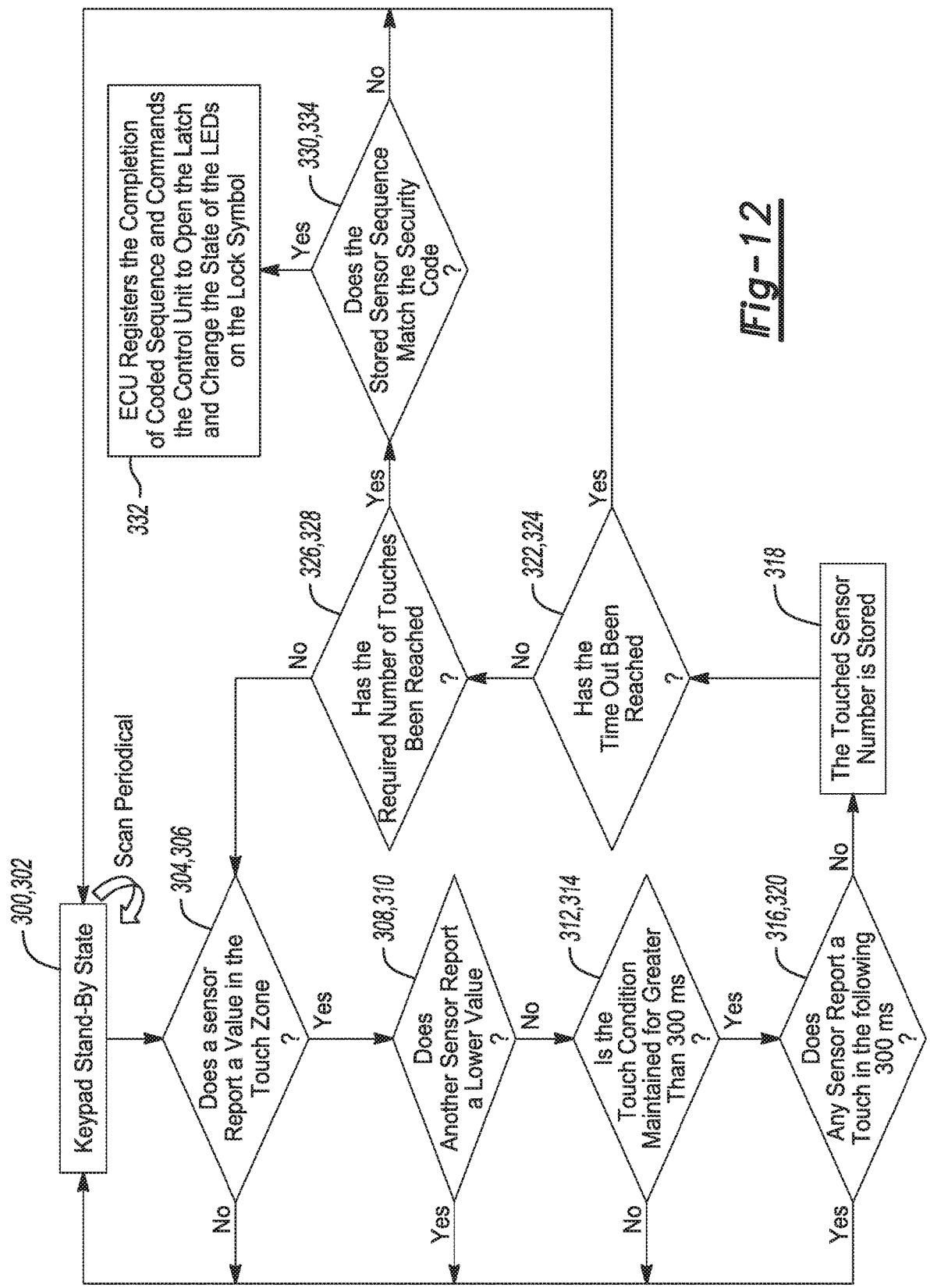
FIG. 12 is a flowchart illustrating steps of a method of operating a touch and gesture pad to sense a touch according to aspects of the disclosure.
Figure 13B:
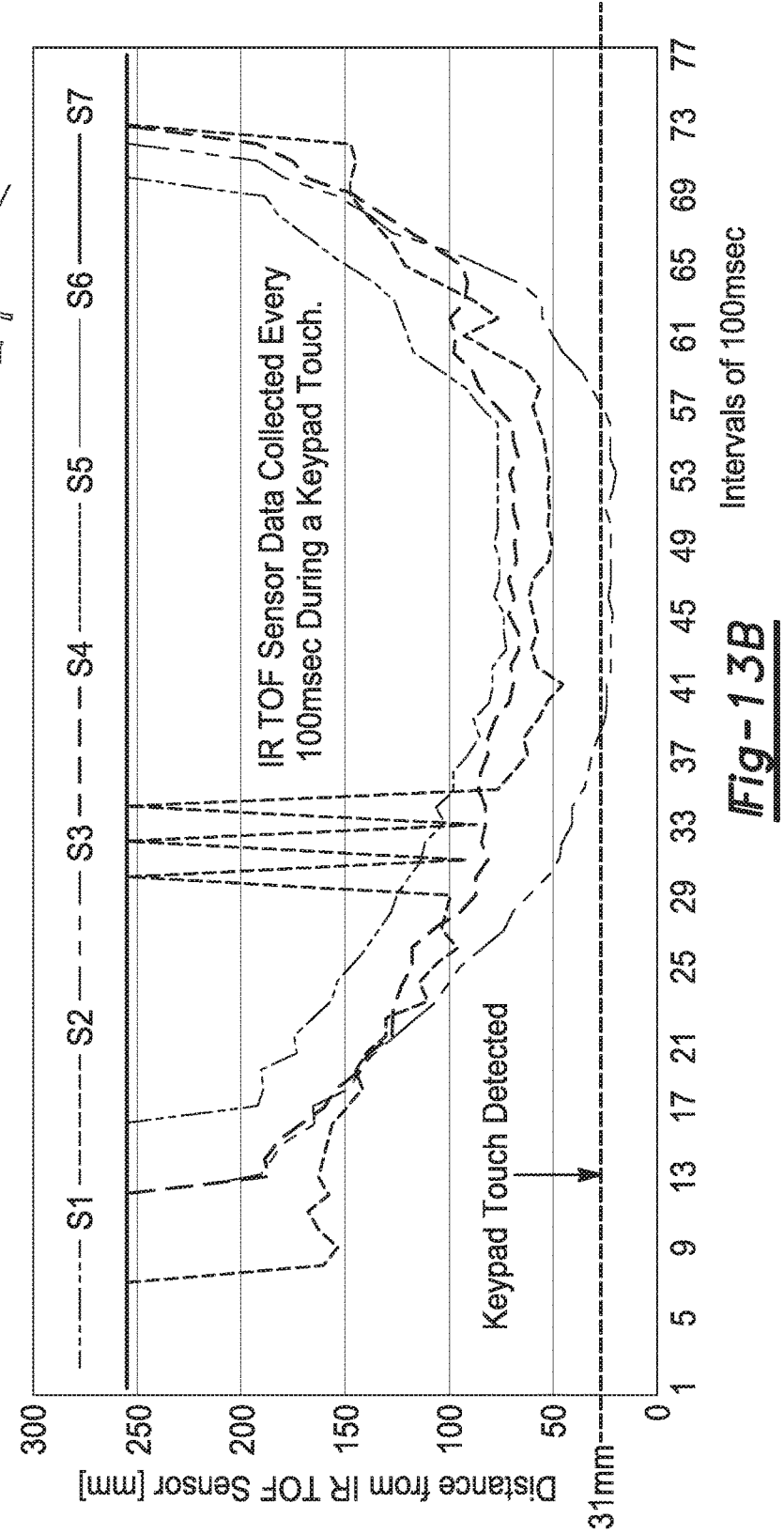

As illustrated more specifically in FIG. 12, the method of operating the touch and gesture pad 46 to sense a touch begins with the step of 300 maintaining the processing unit 32 in the stand-by state. Next, 302 periodically scanning for a first IR TOF signal from one of the plurality of IR TOF sensors 104, 106, 108, 110, 112, 114, 116 using the processing unit 32 in the stand-by state. Specifically, the IR TOF sensors 104, 106, 108, 110, 112, 114, 116 are polled via the I2C bus by the processing unit 32 every 1 millisecond. It should be understood that any polling rate can be implemented alternatively. An example graph of IR TOF signals over time from each of the IR TOF sensors 104, 106, 108, 110, 112, 114, 116 during a touch is shown in FIG. 13B. The method then includes the step of 304 determining whether the first IR TOF signal from one of the plurality of IR TOF sensors 104, 106, 108, 110, 112, 114, 116 is a first value indicating that an object is in the touch sensing zone 136 to define a touch condition. Then, 306 returning to the stand-by state in response to the first IR TOF signal not being the first value.

The method of operating the touch and gesture pad 46 to sense a touch includes the step of 308 determining whether a second IR TOF signal from another one of the plurality of IR TOF sensors 104, 106, 108, 110, 112, 114, 116 is a second value which is a lower value than the first value in response to the first IR TOF signal being the first value. As described above, the term "lower value" is illustratively used herein to refer to a distance measurement, for example, if the first IR TOF signal corresponds with a distance of 0-20 mm, and the second IR TOF signal that is received corresponds with 0-10 mm, the second IR TOF signal would be considered to be a "lower value" than the first IR TOF signal. The method continues by 310 returning to the stand-by state in response to the second IR TOF signal being the second value. Next, 312 determining whether the touch condition is maintained for greater than a first preset time period in response to the second IR TOF signal not being the second value. The method also includes the step of 314 returning to the stand-by state in response to the touch condition not being maintained for greater than the first preset time period. The next step of the method is 316 determining whether one of the plurality of IR TOF sensors 104, 106, 108, 110, 112, 114, 116 report a touch in a second preset time period in response to the touch condition being maintained for greater than the first preset time period.

The method of operating the touch and gesture pad 46 to sense a touch also includes the step of 318 storing a sensor number (i.e., index) associated with the sensor that has been touched in response to the one of the plurality of IR TOF sensors 104, 106, 108, 110, 112, 114, 116 not reporting a touch in the second preset time period. Then, 320 returning to the stand-by state in response to the one of the plurality of IR TOF sensors 104, 106, 108, 110, 112, 114, 116 reporting a touch in a second preset time period. The method continues with the steps of 322 determining whether a time out has been reached and 324 returning to the stand-by state (i.e., returning to step 300) in response to the time out being reached.

The method of operating the touch and gesture pad 46 to sense a touch also continues with the step of 326 determining whether a required number of touches has been reached in response to the time out not being reached. Next, 328 returning to the step of determining whether the first IR TOF signal from one of the plurality of IR TOF sensors 104, 106, 108, 110, 112, 114, 116 is a first value in response to a determination that the required number of touches has not been reached. The next step of the method is 330 determining whether a stored sensor sequence (i.e., sequence of indexes associated with the plurality of IR TOF sensors 104, 106, 108, 110, 112, 114, 116 indicating a touch) matches a security code in response to a determination that the required number of touches has been reached. The method continues with the step of 332 registering the completion of coded sequence and commanding the processing unit 32 to open a latch mechanism 38 and change the state of a plurality of lock indicator LEDs 126, 128, 130, 132 in response to stored sensor sequence matching the security code. Otherwise, the method concludes with the step of 334 returning to the stand-by state in response to the stored sensor sequence not matching the security code.

Figure 14:
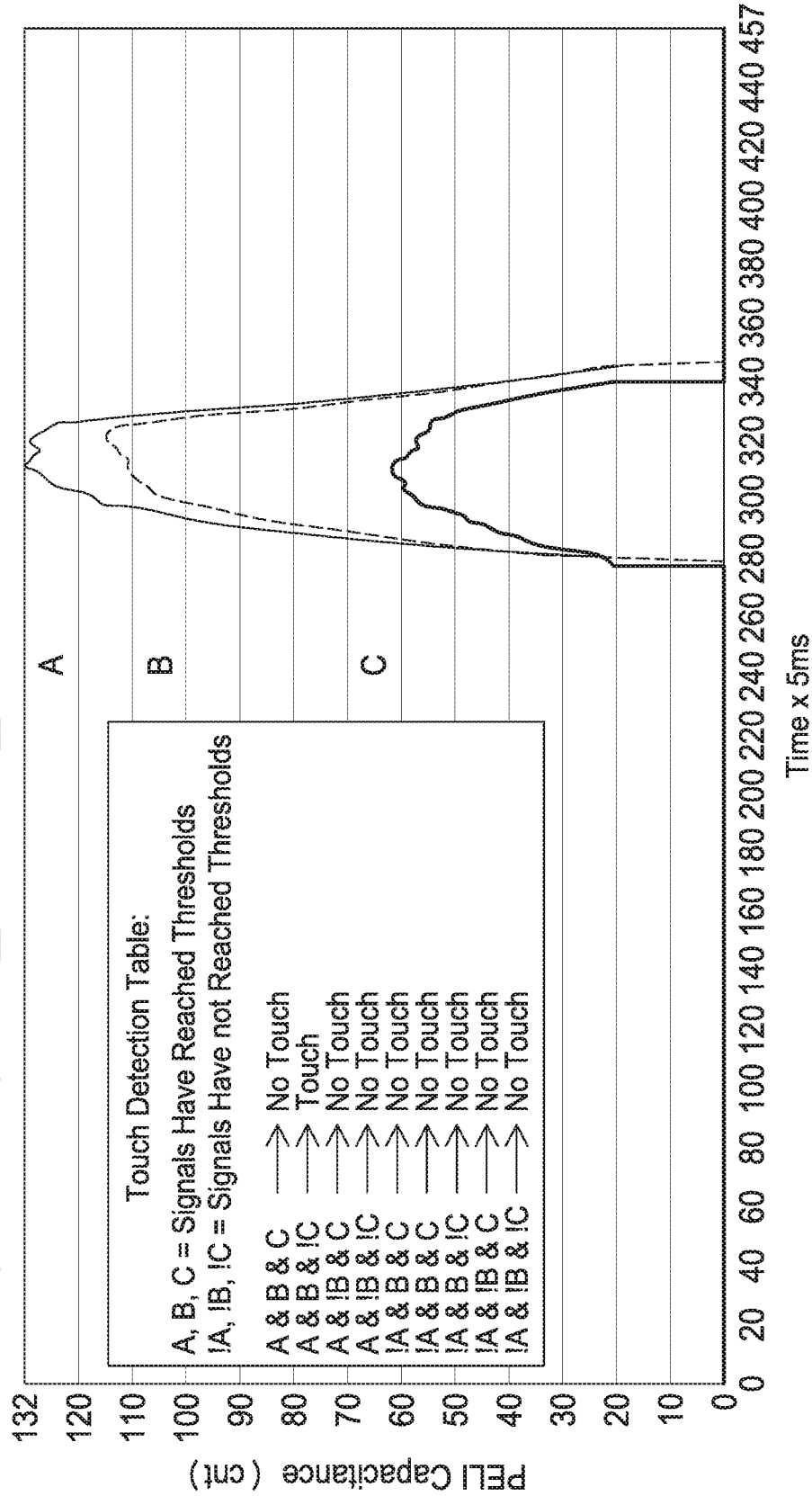
FIG. 14 illustrates an example output of capacitive sensors for a prior art touch sensor.

Clearly, changes may be made to what is described and illustrated herein without departing from the scope defined in the accompanying claims. The touch and gesture pad 46 may be operable for any kind of different closure device incorporated within the motor vehicle 10, for example and advantageously improves upon capacitive sensing solutions. An example capacitive sensor output graph for a prior art touch sensor is illustrated in FIG. 14. Specifically, capacitive signals from three electrodes are monitored, for example, and evaluated against thresholds to determine if a touch condition has been met. Such capacitive sensing solutions can generally detect touch only, not gestures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example touch and gesture pad 46 can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A keyless entry system for swipe/tap entry verification comprising:
    a touch and gesture pad defining a plurality of selectable regions;
    said touch and gesture pad including a plurality of sensors in a spaced relationship with one another for sensing at least one of a touch to said touch and gesture assembly in said plurality of selectable regions and a gesture adjacent to said touch and gesture assembly, wherein the gesture is an activation of said plurality of selectable regions in sequence in a gesture sensing zone spaced from said touch and gesture pad; and
    said plurality of sensors each including a transmitter for transmitting beam with a wavelength and a receiver for receiving the beam after reflection from an object near one of said plurality of sensors and for outputting a sensor signal indicating one of the touch and the gesture;
    a processing unit in communication with said plurality of sensors and configured to simultaneously sense the at least one of the touch to said touch and gesture pad in said plurality of selectable regions and the gesture adjacent said touch and gesture pad; and
    a raised lock indicator of light transmissive material disposed in said at least one lock indicator recess and including a first raised lock indicator section and a second raised lock indicator section and wherein said touch and gesture pad includes a plurality of lock indicator LEDs disposed adjacent said raised lock indicator for separately illuminating said first raised lock indicator section and said second raised lock indicator section;
    wherein said touch and gesture pad includes a housing defining a compartment and a PCB disposed in said compartment and a wiring connector for attachment to a wiring harness to provide electrical power and communication with the processing unit;
    wherein said touch and gesture pad includes a cover of clear acrylic attached to said housing and including an infrared transmissive ink printed on a bottom side of said cover for defining said selectable regions and at least one diagnostic indicator region and at least one lock indicator region;
    wherein said touch and gesture pad includes an intermediate layer disposed between said cover and said PCB in said compartment and defining a plurality of numeral recesses and at least one diagnostic indicator recess and at least one lock indicator recess.

2. The keyless entry system as set forth in claim 1, wherein said plurality of sensors are a plurality of IR TOF sensors in a linearly spaced relationship with one another.

3. The keyless entry system as set forth in claim 1, wherein the processing unit is in communication with a keyfob and further configured to sense the gesture when the keyfob is available and in response unlock a door of a vehicle.

4. The keyless entry system as set forth in claim 1, wherein the processing unit is further configured to unlock a door of a vehicle in response to sensing the touch to said touch and gesture pad.

5. The keyless entry system as set forth in claim 1, wherein the processing unit is in communication with a keyfob and further configured to sense the touch when the keyfob is not available and in response unlock a door of a vehicle.

6. A method of operating a touch and gesture pad to sense a gesture, comprising the steps of:
    periodically scanning for a sensor signal from one of a plurality of sensors using a processing unit in a stand-by state;
    determining whether one of a top-most-sensor and a bottom-most sensor detects an object in a gesture sensing zone;
    detecting one of a downward swipe and an upward swipe using the plurality of sensors;
    determining whether a gesture sequence is completed before a predetermined time elapses; and
    registering the completion of one of the downward swipe and the upward swipe in response to the gesture sequence being completed before the predetermined time elapses;
    wherein the step of determining whether one of the top-most-sensor and the bottom-most sensor detects the object in the gesture sensing zone includes determining whether none of the other plurality of sensors detects the object closer than one of the top-most sensor and the bottom-most sensor, and
    wherein the bottom-most sensor is a first IR TOF sensor and the top-most sensor is a seventh IR TOF sensor and the method further includes the step of confirming that one of a second IR TOF sensor and a third IR TOF sensor and a fourth IR TOF sensor and a fifth IR TOF sensor and a sixth IR TOF sensor do not detect an object closer than one of the first IR TOF sensor and the seventh IR TOF sensor.

7. The method as set forth in claim 6, wherein the step of determining whether one of the top-most-sensor and the bottom-most sensor detects an object includes determining whether none of the other plurality of sensors detects the object closer than one of the top-most sensor and the bottom-most sensor.

8. The method as set forth in claim 6, further including the steps of:
  determining whether the previously detected sensor indicates a touch in response to the distance to the object being in the touch sensing zone;
  returning to the stand-by state in response to the previously detected sensor indicating a touch; and
  determining whether another of the plurality of sensors report an object closer than the previously detected sensor using the processing unit in response to the previously detected sensor not indicating a touch; and
  returning to the stand-by state in response to another of the plurality of sensors reporting an object closer than the previously detected sensor.

9. The method as set forth in claim 6, further including the steps of:
  maintaining a processing unit in a stand-by state;
  returning to the stand-by state in response to not detecting that the object is in the gesture sensing zone with one of the bottom-most sensor and the top-most sensor; and
  flagging one of the top-most sensor and the bottom-most sensor as a previously detected sensor and an expected direction in response to detecting that the object is in the gesture sensing zone.

10. The method as set forth in claim 9, further including the steps of:
  determining whether a next sensor detects the object and whether the next sensor detecting the object is adjacent to the previously detected sensor;
  returning to the stand-by state in response to the next sensor detecting the object not being adjacent to the previously detected sensor; and
  returning to the stand-by state in response to the gesture sequence not being completed before the predetermined time elapses.

11. A method of operating a touch and gesture pad to detect a touch, comprising the steps of:
  maintaining a processing unit in the stand-by state;
  periodically scanning for a first sensor signal from one of the plurality of sensors using the processing unit in the stand-by state;
  determining whether the first sensor signal from one of the plurality of sensors is a first value indicating that an object is in a touch sensing zone to define a touch condition;
  returning to the stand-by state in response to the first sensor signal not being the first value;
  determining whether the touch condition is maintained for greater than a first preset time period;
  returning to the stand-by state in response to the touch condition not being maintained for greater than the first preset time period;
  storing at least one of a sensor number of a stored sensor sequence associated with the one of the plurality of sensors that has detected the touch condition;
  determining whether the stored sensor sequence matches a security code in response to a determination that the required number of touches has been reached;
  registering the completion of coded sequence in response to stored sensor sequence matching the security code;
  returning to the stand-by state in response to the stored sensor sequence not matching the security code;
  determining whether a second sensor signal from another one of the plurality of sensors is a second value lower than the first value in response to the first sensor signal being the first value;
  returning to the stand-by state in response to the second sensor signal being the second value; and
  determining whether one of the plurality of sensors report a touch in a second preset time period in response to the touch condition being maintained for greater than the first preset time period.

12. The method as set forth in claim 11, further including the steps of:
  returning to the stand-by state in response to the one of the plurality of sensors reporting a touch in the second preset time period; and
  determining whether a time out has been reached and returning to the stand-by state in response to the time out being reached.

13. The method as set forth in claim 12, further including the steps of:
  determining whether a required number of touches has been reached in response to the time out not being reached; and
  returning to the step of determining whether the first sensor signal from the one of the plurality of sensors is the first value in response to a determination that the required number of touches has not been reached.

14. The method as set forth in claim 11, wherein the step of registering the completion of coded sequence in response to stored sensor sequence matching the security code includes commanding the processing unit to open a latch and change the state of a plurality of lock indicator LEDs in response to stored sensor sequence matching the security code.

15. A method of operating a touch and gesture pad to sense a gesture, comprising the steps of:
  periodically scanning for a sensor signal from one of a plurality of sensors using a processing unit in a stand-by state;
  determining whether one of a top-most-sensor and a bottom-most sensor detects an object in a gesture sensing zone;
  detecting one of a downward swipe and an upward swipe using the plurality of sensors;
  determining whether a gesture sequence is completed before a predetermined time elapses; and
  registering the completion of one of the downward swipe and the upward swipe in response to the gesture sequence being completed before the predetermined time elapses;
  maintaining a processing unit in a stand-by state;
  returning to the stand-by state in response to not detecting that the object is in the gesture sensing zone with one of the bottom-most sensor and the top-most sensor; and
  flagging one of the top-most sensor and the bottom-most sensor as a previously detected sensor and an expected direction in response to detecting that the object is in the gesture sensing zone.

* * * * *